United States Patent
Percival et al.

(10) Patent No.: US 7,861,638 B1
(45) Date of Patent: Jan. 4, 2011

(54) TRANSPARENT BLAST AND BALLISTIC PROJECTILE RESISTANT BARRIER

(75) Inventors: Jeffrey D. Percival, Camdenton, MO (US); Richard L. LaBrash, Salem, MO (US)

(73) Assignee: DefBar Systems LLC, Salem, MO (US)

( * ) Notice: Subject to any disclaimer, the term of this patent is extended or adjusted under 35 U.S.C. 154(b) by 889 days.

(21) Appl. No.: 11/735,696

(22) Filed: Apr. 16, 2007

Related U.S. Application Data

(60) Provisional application No. 60/814,521, filed on Jun. 15, 2006.

(51) Int. Cl.
*F41H 5/04* (2006.01)

(52) U.S. Cl. .................. 89/36.02; 89/36.08; 428/49

(58) Field of Classification Search ............. 89/36.02, 89/36.01, 36.04, 36.08; 428/46, 47, 48, 49, 428/76
See application file for complete search history.

(56) References Cited

U.S. PATENT DOCUMENTS

| | | | | |
|---|---|---|---|---|
| 3,380,406 A | * | 4/1968 | Gosnell | 109/80 |
| 3,509,833 A | * | 5/1970 | Cook | 109/82 |
| 3,573,150 A | * | 3/1971 | Broutman et al. | 28/105 |
| 3,637,578 A | * | 1/1972 | Wright et al. | 23/523 |
| 3,700,534 A | * | 10/1972 | Cook | 28/46 |
| 4,911,061 A | * | 3/1990 | Pivitt et al. | 89/36.02 |
| 4,911,969 A | * | 3/1990 | Ogata et al. | 428/67 |
| 5,326,606 A | * | 7/1994 | Labock | 428/49 |
| H001519 H | * | 3/1996 | Semple | 89/36.02 |
| H001567 H | * | 8/1996 | Parsons et al. | 89/36.02 |
| 5,665,450 A | | 9/1997 | Day et al. | |
| 5,705,764 A | * | 1/1998 | Schade et al. | 89/36.02 |
| 6,408,734 B1 | | 6/2002 | Cohen | |
| 6,860,186 B2 | * | 3/2005 | Cohen | 89/36.02 |
| 7,300,893 B2 | * | 11/2007 | Barsoum et al. | 442/134 |
| 7,584,689 B2 | * | 9/2009 | Jones et al. | 89/36.02 |
| 7,681,485 B2 | * | 3/2010 | Neal | 89/36.02 |
| 2003/0110932 A1 | * | 6/2003 | Mohr et al. | 89/36.02 |
| 2004/0083880 A1 | * | 5/2004 | Cohen | 89/36.02 |
| 2007/0068375 A1 | * | 3/2007 | Jones et al. | 89/36.02 |
| 2007/0068376 A1 | * | 3/2007 | Jones et al. | 89/36.02 |
| 2007/0283801 A1 | * | 12/2007 | Gallo | 89/36.02 |
| 2008/0190278 A1 | * | 8/2008 | Martin | 89/36.07 |
| 2009/0217813 A1 | * | 9/2009 | Carberry et al. | 89/36.02 |
| 2009/0308239 A1 | * | 12/2009 | Jones et al. | 89/36.02 |
| 2009/0320675 A1 | * | 12/2009 | Landingham et al. | 89/36.02 |
| 2009/0320676 A1 | * | 12/2009 | Cronin et al. | 89/36.05 |
| 2010/0031810 A1 | * | 2/2010 | Neal | 89/36.02 |

* cited by examiner

*Primary Examiner*—Benjamin P Lee
(74) *Attorney, Agent, or Firm*—Thompson Coburn LLP; Joseph M. Rolnicki

(57) ABSTRACT

A transparent blast and ballistic projectile resistant barrier is comprised of a two-dimensional array of transparent hardened tiles that are encapsulated in a transparent resin layer. Preferably, the hardened tiles are transparent ceramic tiles, and the resin layer is a transparent polyurethane encapsulating the tiles. Additional transparent polycarbonate layers and glass fiber layers are also employed reinforcing the transparent barrier and providing the transparent barrier with polished exterior surfaces.

16 Claims, 2 Drawing Sheets

ID OF THE PREFERRED
TRANSPARENT BLAST AND BALLISTIC PROJECTILE RESISTANT BARRIER

This patent application claims the benefit of provisional patent application No. 60/814,521, filed on Jun. 15, 2006.

BACKGROUND OF THE INVENTION

1. Field of the Invention

The present invention pertains to a projectile resistant barrier, and in particular a transparent blast or ballistic projectile resistant barrier. The barrier is comprised of a two-dimensional array of hardened tiles that are encapsulated in a resin layer. In the preferred embodiment the hardened tiles are transparent ceramic tiles, and the resin layer is transparent polyurethane. Additional transparent polycarbonate layers and glass fiber layers are also employed in the preferred embodiment.

2. Description of the Related Art

In the prior art construction of transparent blast and ballistic resistant barriers (i.e., bulletproof glass), the transparent barriers have been comprised of laminates made up of multiple layers of glass, of plastic, or of combinations of glass and plastic layers. These transparent barrier laminates provide protection against various threats based mainly on the thickness of the laminates.

However, this prior construction of transparent barriers has many disadvantages. These disadvantages include the inability of the transparent barriers to stop multiple projectiles or multiple fragments hitting the barriers in close proximity to each other. Each projectile or fragment hitting the transparent barrier typically shatters an area of the barrier. With multiple hits to the transparent barrier, the multiple shattered areas of the barrier can eliminate the ability to see through the barrier. These prior art transparent armor barriers constructed of multiple layers of transparent materials are also disadvantaged in that they have a significant weight for the size of the barrier. In addition, an effective transparent barrier has an excessive thickness, and the multiple layers of the transparent materials reduce the optical quality of the transparent barrier by reducing the light transmitted through the multiple layers.

One of the optimal prior art transparent armor barriers includes an exterior layer or an initial layer of a very hard transparent ceramic material. This material is layered over a conventional glass or plastic backing layer. This design of transparent armor barrier has a reduced weight to area ratio, a reduced thickness to area ratio, and has improved light transmittance properties. However, this design of transparent armor barrier still has the disadvantages of multiple projectile hits on the barrier producing multiple shatter patterns that can effectively eliminate the ability to see through the barrier. In addition, this type of barrier typically has a substantial manufacturing cost in producing a transparent barrier of any practical size.

SUMMARY OF THE INVENTION

The transparent blast and ballistic projectile resistant barrier of the present invention overcomes the disadvantages associated with the prior art transparent armor barriers discussed above. The transparent barrier of the present invention is basically comprised of a plurality of transparent hardened tiles that are arranged side-by-side in a two-dimensional array and are encapsulated in a transparent resin. The index of refraction of the tiles and index of refraction of the resin is the same, which enables a person to view through the transparent barrier without perceiving the existence of the hardened tiles in the barrier. In the preferred embodiment, the transparent tiles are ceramic tiles and the transparent resin is polyurethane. In addition, in the preferred embodiment multiple layers of a transparent polycarbonate are adjoined to opposite surfaces of the plurality of tile and polyurethane layer, and a layer of glass fibers encapsulated in polyurethane reenforces the layer of the plurality of ceramic tiles and encapsulating urethane.

The encapsulated transparent ceramic tiles in the transparent blast and ballistic projectile resistant barrier limits any damage due to a projectile hitting the barrier to the tile hit by the projectile. The polyurethane encapsulating the tile limits the progression of damage due to a projectile hit from being transferred to adjacent tiles. This overcomes the shattering problem of prior art transparent armor barriers. In addition, by matching the light refraction index of the transparent ceramic tiles to the light refraction index of the urethane encapsulating the tiles, the interface between the transparent tiles and the transparent polyurethane is effectively invisible, giving the overall construction of the transparent armor barrier the required optical clarity.

Thus, the transparent armor barrier of the invention provides a transparent barrier that has excellent performance in all of the desired properties including, a multi-hit capability, low weight, reduced thickness, resistant to breakage or cracking, improved light transmittance and low cost.

BRIEF DESCRIPTION OF THE DRAWINGS

Further features of the invention are set forth in the following detailed description of the preferred embodiments of the invention, and in the drawing figures.

DETAILED DESCRIPTION OF THE PREFERRED EMBODIMENT

Figure 1:
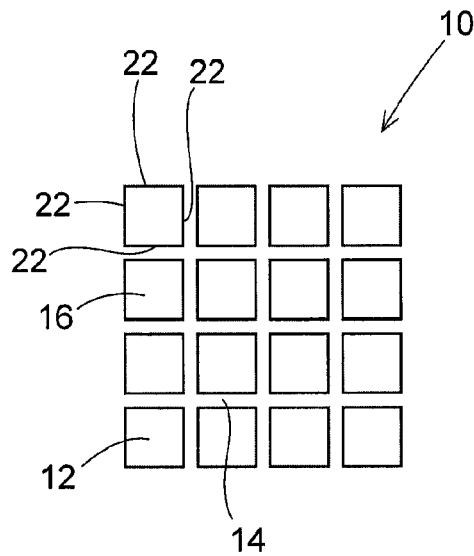
FIG. 1 shows a schematic representation of the plurality of hard ceramic tiles encapsulated in the polyurethane layer of the invention.

In the preferred embodiment of the invention, the blast and ballistic projectile barrier 10 of the invention is designed as a transparent barrier. However, it should be kept in mind that the same concept of the invention can be employed in constructing an opaque barrier having the same basic construction of the invention. The foundation of the system is in a plurality of hard tiles 12 encapsulated in a layer of resin 14. Together, the layer of tiles 12 encapsulated in the resin 14 are formed as a sheet. In the preferred embodiment of the invention, the tiles 12 are formed of a hard transparent material and are encapsulated in a hardened transparent resin layer 14. The index of refraction of both the transparent tiles 12 and the resin layer 14 is the same, enabling a person to view through the barrier formed by the hardened tiles 12 and the resin layer 14 without the interface of the tiles in the layer of resin affecting the person's vision. As stated earlier, if a transparent barrier is not needed, the tiles 12 and the resin encapsulating layer 14 can be opaque materials.

In the preferred embodiment, the plurality of hardened transparent tiles 12 are transparent ceramic tiles having a high aluminum oxide content. Alternative materials include borosilicate glass, any high strength glass, any glass containing ceramic compounds, or yttrium. In the preferred embodiment of the invention, the transparent ceramic tiles 12 are pressed or shaped tiles that do not require grinding or polishing. The resin 14 encapsulating the transparent tiles 12 is preferably polyurethane. Alternate materials include polymethylmethacrylate, polysiloxane, and silicone. Preferably, each of the tiles 12 has a flat, parallel, front 16 and back 18 surface. The tiles 12 are also formed with flat sidewalls 22 that are arranged in a polygonal configuration.

FIGS. 1-4 show various different possible configurations of the plurality of tiles 12. The arrangements of the tiles 12 shown in FIGS. 1-4 are schematic representations. FIG. 1 shows the plurality of tiles 12, each having a square or cube configuration. The tiles 12 are arranged in a two-dimensional arrayed layer of rows and columns.

Figure 2:
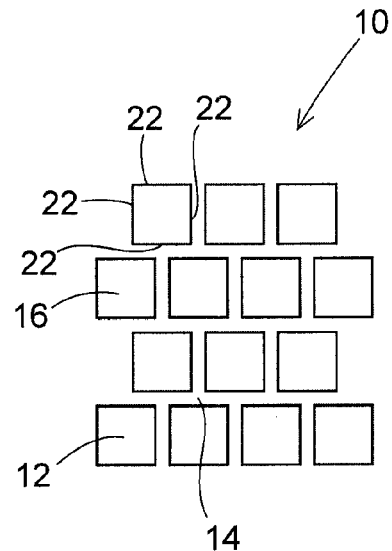
FIG. 2 is a view similar to that of FIG. 1, but showing a different arrayed arrangement of the hard tiles in the urethane layer.

FIG. 2 shows a similar arrangement of the tiles 12 to that of FIG. 1, with the tiles 12 arranged in rows, but not aligned in columns.

Figure 3:
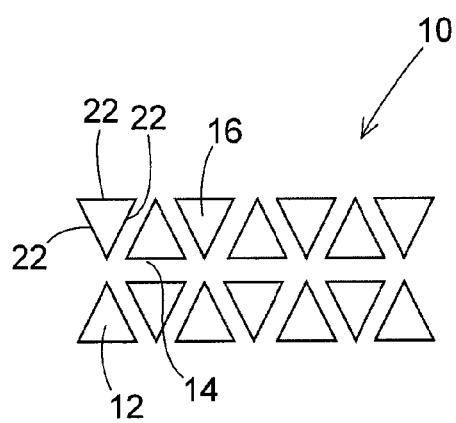
FIG. 3 is a view similar to that of FIG. 1, but showing a different arrangement and configuration of the hard tiles in the polyurethane layer.

FIG. 3 shows an embodiment where the tile sidewalls 12 have triangular configurations.

Figure 4:
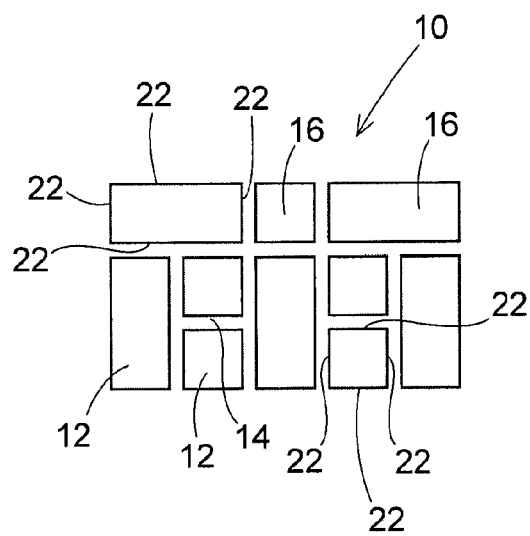
FIG. 4 is a view similar to FIG. 1, but showing a different arrangement and configuration of the hard tiles in the polyurethane layer.
Figure 5:
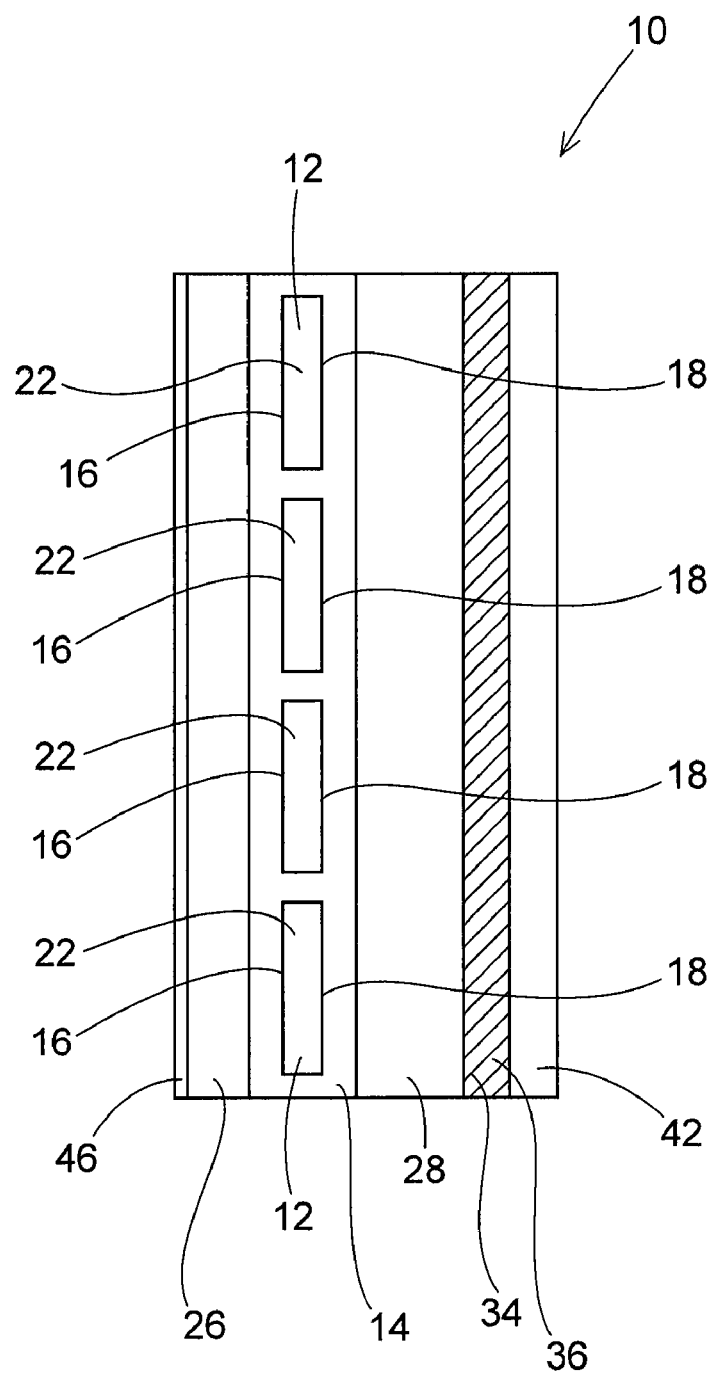
FIG. 5 is a schematic representation of a cross-section of the transparent blast and ballistic projectile resistant barrier of the invention.

FIG. 4 shows an embodiment where the tiles 12 have sidewalls 22 with rectangular configurations and with square configurations.

FIGS. 1-4 illustrate the possibility of using a plurality of tiles 12 in the invention where the configurations of the tiles are varied. However, in the preferred embodiment of the invention, the tile sidewalls 22 give the tile a polygonal configuration. This enables the tiles to be arranged in a two-dimensional array, where the spacing between adjacent tiles is minimized. The spacing between adjacent tiles in each of FIGS. 1-4 is exaggerated. In the preferred embodiment, the plurality of tiles 12 are arranged in a single two-dimensional layer with opposing sidewalls of adjacent tiles 22 being in close proximity to each other. In the preferred embodiment the spacing between the opposing sidewalls of adjacent tiles 22 is only 0.02 inches to 0.03 inches. This allows sufficient spacing between adjacent tiles for the polyurethane encapsulating the tiles 12 to extend between the opposing sidewalls 22 of adjacent tiles. The polyurethane 14 separating the adjacent tiles 12 in this manner provides a cushion between adjacent tiles that enables any impact damage due to a projectile striking a tile of the barrier to be isolated to that tile, and not propagate to adjacent tiles. In this manner, the barrier of the invention overcomes the shattering problem of prior art transparent barriers. Although the polygonal configuration of the tiles 12 is preferred to enable the tiles to be positioned in close proximity to each other, other configurations of tiles are possible in the general concept of the invention.

The foundation of the transparent barrier of the invention also comprises a first layer of transparent resin 26 formed in a sheet adjoining one side of the layer of the plurality of transparent tiles 12 encapsulated in the transparent polyurethane 14. The resin is preferably polycarbonate. This first layer of transparent polycarbonate 26 is positioned on a side of the tile 12 and polyurethane 14 layer that would serve as the exterior surface of the transparent barrier in use. Other alternate materials to this first layer of polycarbonate 26 include polyurethane and polymethylmethacrylate. However, the polycarbonate is preferred in this layer 26.

A second layer of transparent resin 28 is formed in a sheet adjoining the opposite side of the layer of the plurality of tiles 12 and the polyurethane 14 from the first polycarbonate layer 26. As in the first transparent polycarbonate layer 26, the resin is preferably polycarbonate. Alternate materials include polyurethane and polymethylmethacrylate.

A layer of transparent glass fibers 34 encapsulated in a resin 36, preferably a polyurethane matrix, is formed as a reinforcing sheet that adjoins the second transparent polycarbonate layer 28. The glass fibers in polyurethane in this layer are preferred, however other alternate materials include polycarbonate fiber in a polyurethane matrix. This glass fiber 34 and polyurethane 36 layer reinforces the transparent barrier 10.

A third transparent resin layer 42 is formed in a sheet adjoining the glass fiber 34 and polyurethane 36 layer. In the preferred embodiment, this third transparent resin layer 42 is a polycarbonate layer. This sandwiches the laminates of the barrier between the first transparent polycarbonate layer 26 and the third transparent polycarbonate layer 42. The first transparent polycarbonate layer 26 and the third transparent layer 42 can be polished to provide the layer with transparent durable coating layers on both internal and external surfaces of the barrier. This gives the barrier an aquarium effect for optical clarity.

In the preferred embodiment, the exterior surface of the barrier 10 is provided with a coated disposable rock resistant sacrificial layer 46. In the preferred embodiment, this exterior layer 46 of the transparent barrier has a polysiloxane base with a vacuum deposited synthetic diamond top coating. Alternate materials include polysiloxane, polyurethane, polymethylmethacrylate, and melamine. This exterior layer 46 protects the other layers of the laminate barrier 10 against scratching and chipping from rocks and other similar materials.

The barrier 10 of the invention constructed in the manner described above provides a novel transparent armor that has a truly transparent tile system. The index of refraction matching between the tiles 12 and the encapsulating polyurethane 14 are the foundation of the transparent barrier. The barrier 10 is also the first to use transparent optic fiber 34 and encapsulating polyurethane 36 as a reinforcement in the barrier. The barrier 10 of the invention described above achieves the objectives of providing a blast and ballistic projectile resistant transparent barrier that has excellent performance in all of the desired properties including multi-hit capability, low weight per area, reduced thickness per area, resistance to breakage or cracking, improved light transmittance, and low manufacturing cost.

Although the transparent barrier of the invention has been described above by reference to specific embodiments, it should be understood that modifications and variations could be made to the barrier with departing from the intended scope of protection provided by the following claims.

What is claimed is:

1. A transparent projectile barrier comprising:
a layer of a plurality of transparent tiles, with each tile being encapsulated in a transparent resin, the plurality of transparent tiles and the transparent resin encapsulating the plurality of transparent tiles having a same index of refraction, the layer of the plurality of transparent tiles encapsulated in the transparent resin being formed as a sheet.

2. The barrier of claim 1, further comprising:
the plurality of tiles each being a transparent ceramic tile.

3. The barrier of claim 2, further comprising:
the transparent resin encapsulating the plurality of transparent tiles being polyurethane.

4. The barrier of claim 3, further comprising:
a layer of transparent polycarbonate formed as a sheet adjoining the layer of the plurality of transparent ceramic tiles encapsulated in the transparent polyurethane.

5. The barrier of claim 4, further comprising:
a layer of transparent glass fibers encapsulated in a transparent resin and formed as a sheet reinforcing the layer of the plurality of transparent ceramic tiles encapsulated in the transparent polyurethane.

6. The barrier of claim 1, further comprising:
the plurality of transparent tiles each having sidewalls that are arranged in a polygonal configuration.

7. The barrier of claim 6, further comprising:
the transparent resin encapsulating the plurality of titles extending between opposing sidewalls of adjacent tiles.

8. The barrier of claim 1, further comprising:
a layer of transparent glass fibers encapsulated in a transparent resin and formed as a sheet reinforcing the layer of the plurality of tiles encapsulated in the transparent resin.

9. The barrier of claim 1, further comprising:
the plurality of tiles being arranged in only two dimensions.

10. A transparent projectile barrier comprising:
a first layer of transparent polycarbonate formed as a sheet;
a layer of a plurality of transparent ceramic tiles encapsulated in a transparent polyurethane, the plurality of transparent ceramic tiles and the polyurethane having a same index of refraction, the layer of the plurality of transparent ceramic tiles encapsulated in the transparent polyurethane being formed as a sheet adjoining the first layer of transparent polycarbonate;
a second layer of transparent polycarbonate formed as a sheet adjoining the layer of the plurality of transparent ceramic tiles encapsulated in the transparent polyurethane; and,
a layer of transparent glass fibers encapsulated in polyurethane and formed as a sheet adjoining the second layer of transparent polycarbonate.

11. The projectile barrier of claim 10, further comprising:
a third layer of transparent polycarbonate formed as a sheet adjoining the layer of transparent glass fibers encapsulated in the polyurethane.

12. The projectile barrier of claim 10, further comprising:
an exterior layer of transparent polysiloxane formed as a sheet adjoining the first layer of transparent polycarbonate.

13. The barriers of claim 10, further comprising:
in the layer of the plurality of transparent ceramic tiles encapsulated in the transparent polyurethane, the transparent polyurethane extending between each of the plurality of transparent ceramic tiles and the first layer of transparent polycarbonate.

14. A transparent projectile barrier comprising:
an exterior layer of transparent polysiloxane resin formed as a sheet;
a first layer of transparent polycarbonate formed as a sheet adjoining the layer of transparent polysiloxane resin;
a layer of a plurality of transparent ceramic tiles, with each tile being encapsulated in a transparent polyurethane, the plurality of transparent ceramic tiles and the transparent polyurethane having a same index of refraction, the layer of the plurality of transparent ceramic tiles encapsulated in the transparent polyurethane being formed as a sheet adjoining the first layer of transparent polycarbonate;
a second layer of transparent polycarbonate formed as a sheet adjoining the layer of the plurality of transparent ceramic tiles encapsulated in the transparent polyurethane;
a layer of transparent glass fibers encapsulated in polyurethane and formed as a sheet adjoining the second layer of transparent polycarbonate; and,
a third layer of transparent polycarbonate formed as a sheet adjoining the layer of transparent glass fibers encapsulated in the polyurethane.

15. The barrier of claim 14, further comprising:
in the layer of the plurality of transparent ceramic tiles encapsulated in the transparent polyurethane, the transparent polyurethane extends between adjacent transparent ceramic tiles.

16. The barrier of claim 14, further comprising:
in the layer of the plurality of transparent ceramic tiles encapsulated in the transparent polyurethane, the transparent polyurethane extends between each of the plurality of transparent ceramic tiles and the first layer of transparent polycarbonate.

\* \* \* \* \*